No. 761,390. PATENTED MAY 31, 1904.
U. NEHRING.
LENS.
APPLICATION FILED FEB. 15, 1904.
NO MODEL.

WITNESSES:

*Ulrich Nehring* INVENTOR

BY

ATTORNEY

No. 761,390.

Patented May 31, 1904.

UNITED STATES PATENT OFFICE.

ULRICH NEHRING, OF NEW YORK, N. Y., ASSIGNOR TO THE SCIENTIFIC LENS COMPANY, OF NEW YORK, N. Y., A CORPORATION OF NEW YORK.

LENS.

SPECIFICATION forming part of Letters Patent No. 761,390, dated May 31, 1904.

Application filed February 15, 1904. Serial No. 193,550. (No model.)

*To all whom it may concern:*

Be it known that I, ULRICH NEHRING, a citizen of the United States, residing in New York, in the county of New York and State of New York, have invented certain new and useful Improvements in Lenses, of which the following is a specification.

The present invention relates to lenses, and more particularly to lenses used in producing photographic negatives.

It is a well-known fact in the art of photography that lenses are subject to spherical and chromatic aberration, producing a difference in the focal distance between the edge rays of a lens and the center rays of the same and between the more refrangible violet rays and the less refrangible red rays. These defects become apparent in photography by causing differently sharp or distorted pictures or by not giving a true record of the correct color value of an original object. It has heretofore been tried to overcome these defects in the production of photographic negatives by moving the entire photographic lens or lens system to and from the sensitive surface during the time of exposure. In the United States Patent No. 756,881, granted April 12, 1904, one apparatus for doing this has been described and claimed; and the present invention has for its object to accomplish this effect of forming images by changing the focal distance of a lens or lens set by different means than the means set forth in said patent—that is, by the interpolation of an auxiliary lens during the time of exposure; and it consists of the construction illustrated in the accompanying drawings, in which—

Figure 1:
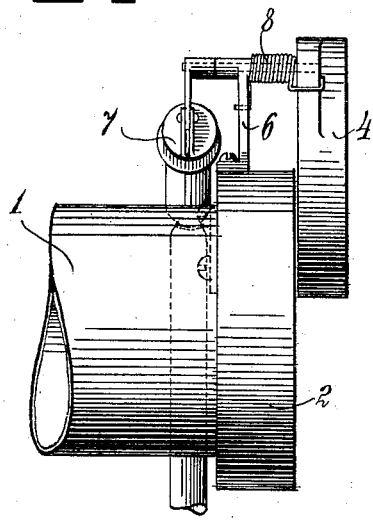
Figure 2:
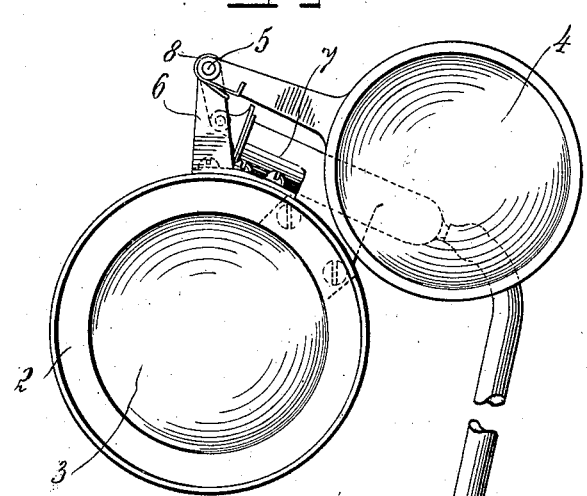
Figure 3:
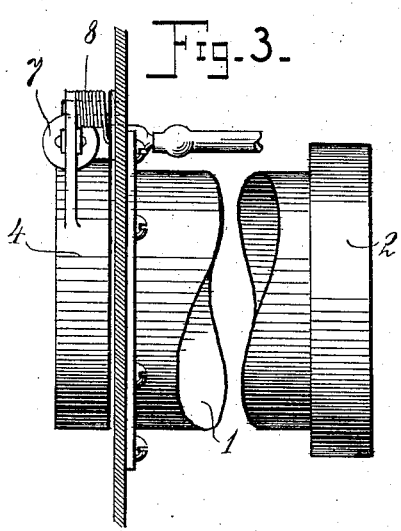

Figure 1 is a side view of a photographic lens according to the present invention. Fig. 2 is a front view of the same. Fig. 3 is a side view of a modified form of the invention, and Fig. 4 a side view of a detachable form of the same.

In more fully considering the underlying invention it is well to keep in mind that the focus of a lens is that point in the optical axis of the lens in which parallel rays meet after emergence and that the focal distance of a lens is the distance between the focus of the lens and the optical center of the same.

The equivalent focus of a lens system comprising a series or plurality of lenses is that point in the optical axis of the system in which parallel rays meet after passing all of the lenses and equivalent focal distance of the lens system is the distance between the equivalent focus of the lens system and the optical center of a theoretical or phantom lens representing the joint action of the lenses forming the lens system.

In the drawings forming part of the present application, 1 is the lens-tube or lens-casing, containing the photographic lens or lenses 3.

2 is the front hood of the lens-casing.

4 is an auxiliary lens movable on a pivot 5, secured by the bracket 6 to the lens tube or casing.

7 is a holding or releasing device well known in the art and in the present case illustrated as a pneumatic-bulb device 9.

8 is a coiled spring, one end of it attached to the bracket and the other to the auxiliary lens for forcing this lens to move past the lens 3 when the releasing device 7 is operated.

Figure 4:
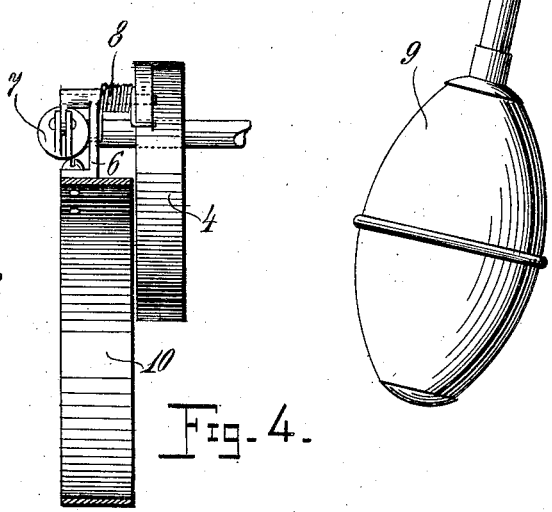

The lens 4 may be located either in the front or the rear of the photographic lens or lenses or between the same. In Fig. 4 a modification is shown in which the auxiliary lens 4 is attached to a detachable hood or cap 10. This modification represents a most convenient arrangement for using this new lens in connection with any of the old lenses now in use without requiring expensive alterations to the old lens.

The operation of the device is most simple. The auxiliary lens 4 is set so as to be held by the release 7 under the tension of the spring 8 and outside of the optical axis of the lens system. The object to be photographed is then focused in the ordinary way, and when the exposure is being made the release 7 is operated and the lens 4 is caused to pass over the lens system and through its optical axis, and thereby changes the focal distance or the equivalent focal distance of the same during the time of exposure.

The auxiliary lens may be made of white optical glass or of tinted or colored glass, so as to act like a ray-screen or color-screen for producing orthochromatic or isochromatic effects on the sensitive surface.

Means may also be provided for regulating the speed of the movement of the auxiliary lens, and an arrangement of the shutter-release and the lens-release may be made for operating the same simultaneously. The auxiliary lens may comprise a single lens or a lens system such as well known in optics or the art of photography.

What is claimed as new and useful, and desired to be secured by United States Letters Patent, is—

1. The combination with a lens or lens set, of an auxiliary lens or lens set adapted to vary the focal distance of the first lens or lens set during the time of exposure.

2. The combination with a lens or lens set, of a detachable auxiliary lens or lens set adapted to vary the focal distance of the first lens or lens set during the time of exposure.

3. The combination with a lens or lens set, of an auxiliary lens or lens set adapted to gradually vary the focal distance of the first lens or lens set during the time of exposure.

4. The combination with a lens or lens set, of a detachable auxiliary lens or lens set, adapted to gradually vary the focal distance of the first lens or lens set during the time of exposure.

5. The combination with a plurality of lenses or lens sets, of an auxiliary lens or lens set adapted to vary the equivalent focal distance of said first lenses or lens-sets during the time of exposure.

6. The combination with a plurality of lenses or lens sets, of a detachable auxiliary lens or lens set adapted to vary the equivalent focal distance of said first lenses or lens sets during the time of exposure.

7. The combination with a plurality of lenses or lens sets, of an auxiliary lens or lens set adapted to gradually vary the equivalent focal distance of said first lenses or lens sets during the time of exposure.

8. The combination with a plurality of lenses or lens sets, of a detachable auxiliary lens or lens set adapted to gradually vary the equivalent focal distance of said first lenses or lens sets during the time of exposure.

9. The combination with a lens or lens set, of an auxiliary lens or lens set, and means for causing said auxiliary lens or lens set to move past the first lens or lens set during the time of exposure.

10. The combination with a lens or lens set, of an auxiliary lens or lens set, and means for causing said auxiliary lens or lens set to gradually move past the first lens or lens set during the time of exposure.

11. The combination with a lens or lens set, of a detachable auxiliary lens or lens set, and means for causing said detachable auxiliary lens or lens set to move past the first lens or lens set during the time of exposure.

12. The combination with a lens or lens set, of a detachable auxiliary lens or lens set, and means for causing said detachable auxiliary lens or lens set to gradually move past the first lens or lens set during the time of exposure.

13. The combination with a plurality of lenses or lens sets, of an auxiliary lens or lens set capable of movement past and at right angles to the axis of said first lenses or lens sets and means for causing said movement during the time of exposure.

14. The combination with a plurality of lenses or lens sets, of a detachable auxiliary lens or lens set capable of movement past and at right angles to the axis of said first lenses or lens sets, and means for causing said movement during the time of exposure.

15. The combination with a plurality of lenses or lens sets, of an auxiliary lens or lens set capable of a gradual movement past and at right angles to the axis of said first lenses or lens sets, and means for causing said gradual movement during the time of exposure.

16. The combination with a plurality of lenses or lens sets, of a detachable auxiliary lens or lens set capable of a gradual movement past and at right angles to the axis of said first lenses or lens sets, and means for causing said gradual movement during the time of exposure.

17. The combination with a lens or lens set, of an auxiliary lens or lens set normally idle, and means for causing a coöperation of the auxiliary lens or lens set with the said first lens or lens set during the time of exposure.

18. The combination with a lens or lens set, of a detachable auxiliary lens or lens set normally idle, and means for causing a coöperation of the detachable auxiliary lens or lens set with the said first lens or lens set during the time of exposure.

19. The combination with a lens or lens set, of an auxiliary lens or lens set normally idle, and means for causing a gradual coöperation of the auxiliary lens or lens set with the said first lens or lens set during the time of exposure.

20. The combination with a lens or lens set, of a detachable auxiliary lens or lens set normally idle, and means for causing a gradual coöperation of the detachable auxiliary lens or lens set with the said first lens or lens set during the time of exposure.

21. The combination with a lens or lens set, of optical means adapted to change the focal distance of said lens or lens set during the time of exposure.

22. The combination with a lens or lens set, of detachable optical means adapted to change the focal distance of said lens or lens set during the time of exposure.

23. The combination with a lens or lens set, of optical means adapted to gradually change the focal distance of said lens or lens set during the time of exposure.

24. The combination with a lens or lens set, of detachable optical means adapted to gradually change the focal distance of said lens or lens set during the time of exposure.

25. The combination with a lens or lens set, of an auxiliary lens or lens set, means for holding said auxiliary lens or lens set out of coöperative relation with said first lens or lens set, and releasing means for said holding means to cause the movement of said auxiliary lens or lens set into coöperative relation with said first lens or lens set during the time of exposure.

26. The combination with a lens or lens set, of a detachable auxiliary lens or lens set, means for holding said detachable auxiliary lens or lens set out of coöperative relation with said first lens or lens set, and releasing means for said holding means to cause the movement of said detachable auxiliary lens or lens set into coöperative relation with said first lens or lens set during the time of exposure.

27. The combination with a lens or lens set, of an auxiliary lens or lens set, and means for moving said auxiliary lens or lens set into and out of the optical axis of said lens or lens set during the time of exposure.

28. The combination with a lens or lens set, of an auxiliary lens or lens set, and means for gradually moving said auxiliary lens or lens set into and out of the optical axis of said first lens or lens set during the time of exposure.

29. The combination with a lens or lens set, of an auxiliary lens or lens set, and elastic or resilient means for moving said auxiliary lens or lens set into and out of the optical axis of said first lens or lens set during the time of exposure.

30. The combination with a lens or lens set, of a detachable auxiliary lens or lens set, and means for moving said auxiliary lens or lens set into and out of the optical axis of said lens or lens set during the time of exposure.

31. The combination with a lens or lens set, of a detachable auxiliary lens or lens set, and means for gradually moving said detachable auxiliary lens or lens set into and out of the optical axis of said first lens or lens set during the time of exposure.

32. The combination with a lens or lens set, of a detachable auxiliary lens or lens set, and elastic or resilient means for moving said detachable auxiliary lens or lens set into and out of the optical axis of said first lens or lens set during the time of exposure.

33. The combination with a lens or lens set, of a detachable auxiliary lens or lens set, and elastic or resilient means for gradually moving said detachable auxiliary lens or lens set into and out of the optical axis of said first lens or lens set during the time of exposure.

34. The combination with a lens or lens set, of a detachable cap or hood therefor, and an auxiliary lens or lens set on said cap or hood and capable of movement into and out of coöperative relation with said first lens or lens set.

35. The combination with a lens or lens set, of a detachable cap or hood therefor, an auxiliary lens or lens set on said cap or hood and capable of movement into and out of coöperative relation with said lens or lens set, and means for causing said movement.

36. The combination with a lens or lens set, of a detachable cap or hood therefor, and an auxiliary lens or lens set on said cap or hood and capable of movement into and out of coöperative relation with said first lens or lens set during the time of exposure.

37. The combination with a lens or lens set, of a detachable cap or hood therefor, an auxiliary lens or lens set on said cap or hood and capable of movement into and out of coöperative relation with said first lens or lens set, and means for causing said movement during the time of exposure.

38. The combination with a lens or lens set, of a detachable cap or hood for said lens or lens set, an auxiliary lens or lens set on said cap or hood and capable of movement into and out of coöperative relation with said lens or lens set during the time of exposure, and means for gradually causing said movement.

39. The combination with a lens or lens set, of a detachable cap or hood for said lens or lens set, an auxiliary lens or lens set on said cap or hood and capable of movement into and out of coöperative relation with said first lens or lens set, and elastic or resilient means for causing said movement.

40. The combination with a lens or lens set, of a detachable cap or hood for said lens or lens set, an auxiliary lens or lens set on said cap or hood and capable of movement into and out of coöperative relation with said first lens or lens set, and elastic or resilient means for causing said movement during the time of exposure.

41. The combination with a lens or lens set, of a detachable cap or hood for said lens or lens set, an auxiliary lens or lens set on said cap or hood and capable of movement into and out of coöperative relation with said first lens or lens set, and elastic or resilient means for gradually causing said movement during the time of exposure.

Signed at New York, in the county of New York and State of New York, this first day of February, 1904.

ULRICH NEHRING.

In presence of—
J. H. T. STEMPE,
HERMANN FUCHSLUGER.